US010703675B2

(12) United States Patent
Wulfert et al.

(10) Patent No.: US 10,703,675 B2
(45) Date of Patent: Jul. 7, 2020

(54) METHOD FOR PROCESSING STEEL SLAG AND HYDRAULIC MINERAL BINDER

(71) Applicant: LOESCHE GmbH, Duesseldorf (DE)

(72) Inventors: Holger Wulfert, Duesseldorf (DE); Horst Michael Ludwig, Duesseldorf (DE)

(73) Assignee: LOESCHE GmbH, Dusseldorf (DE)

( * ) Notice: Subject to any disclaimer, the term of this patent is extended or adjusted under 35 U.S.C. 154(b) by 670 days.

(21) Appl. No.: 14/888,519

(22) PCT Filed: Sep. 1, 2014

(86) PCT No.: PCT/EP2014/068518
§ 371 (c)(1),
(2) Date: Nov. 2, 2015

(87) PCT Pub. No.: WO2015/028668
PCT Pub. Date: Mar. 5, 2015

(65) Prior Publication Data
US 2016/0107930 A1    Apr. 21, 2016

(30) Foreign Application Priority Data
Sep. 2, 2013  (EP) ..................................... 13182576

(51) Int. Cl.
C04B 7/147    (2006.01)
C22B 7/04     (2006.01)
C21B 3/08     (2006.01)
C04B 5/06     (2006.01)

(52) U.S. Cl.
CPC ............... C04B 7/147 (2013.01); C04B 5/06 (2013.01); C21B 3/08 (2013.01); C22B 7/04 (2013.01); Y02P 10/212 (2015.11); Y02P 40/143 (2015.11)

(58) Field of Classification Search
None
See application file for complete search history.

(56) References Cited

U.S. PATENT DOCUMENTS

| 4,120,414 A * | 10/1978 | Harrison ............ B65D 51/1611 215/307 |
| 4,124,404 A * | 11/1978 | Suzuki .................... C04B 7/147 106/765 |
| 4,174,961 A | 11/1979 | Goessens et al. |
| 4,260,414 A * | 4/1981 | Suzuki ................. C01B 25/027 423/322 |
| 5,944,870 A | 8/1999 | Edlinger |
| 2004/0093988 A1 | 5/2004 | Poupardin et al. |
| 2007/0144404 A1 | 6/2007 | Sorrentino et al. |
| 2012/0073406 A1 | 3/2012 | Ki et al. |
| 2015/0135896 A1* | 5/2015 | Harada ................... F27D 15/00 75/10.35 |

FOREIGN PATENT DOCUMENTS

| CN | 101194028 A | | 6/2008 |
| CN | 201495230 | * | 9/2009 |
| EP | 1320501 A1 | | 6/2003 |
| GB | 1556833 A | | 11/1979 |
| JP | S51122670 A | | 10/1976 |
| JP | 59050113 | * | 9/1982 |
| JP | 2012001797 A | | 1/2012 |
| JP | 2013216559 | * | 4/2012 |
| TW | 201412683 A | | 4/2014 |
| WO | 9507365 A1 | | 3/1995 |
| WO | 1996-024696 A1 | | 8/1996 |
| WO | WO 2011107124 | | 9/2011 |
| WO | 2014003123 | * | 1/2014 |

OTHER PUBLICATIONS

Search Report issued in corresponding Chinese Appln. No. 201480024961.4 dated Jan. 23, 2017.
Verein Deutscher Eisenhuttenleuter: "Slag Atlas", Verlag Stahleisen GmbH, Dusseldorf, XP002734482, pp. 105, 134, 1995.
International Search Report dated Jan. 15, 2015 related to PCT/EP2014-068518.
Canadian Examination Report, Canadian Patent Application No. 2,907,991 dated Sep. 19, 2018.

* cited by examiner

Primary Examiner — Sheng H Davis
(74) Attorney, Agent, or Firm — Dinsmore & Shohl LLP

(57) ABSTRACT

The invention relates to a method for processing steel slag to produce a hydraulic mineral binder with a high hardening potential and to recover iron. There is provision for this purpose to provide a feed product comprising steel slag with MnO. This feed product is further processed as a melt by introducing reducing agents into the melt. A lime saturation factor of between 90 and 110 is hereby to be achieved in the mineral melt portion. Subsequently the melt is cooled in a defined manner and elemental iron is mechanically separated from the solidified melt. The solidified melt is then supplied for use as hydraulic mineral binder.

14 Claims, 2 Drawing Sheets

METHOD FOR PROCESSING STEEL SLAG AND HYDRAULIC MINERAL BINDER

Figure 1:
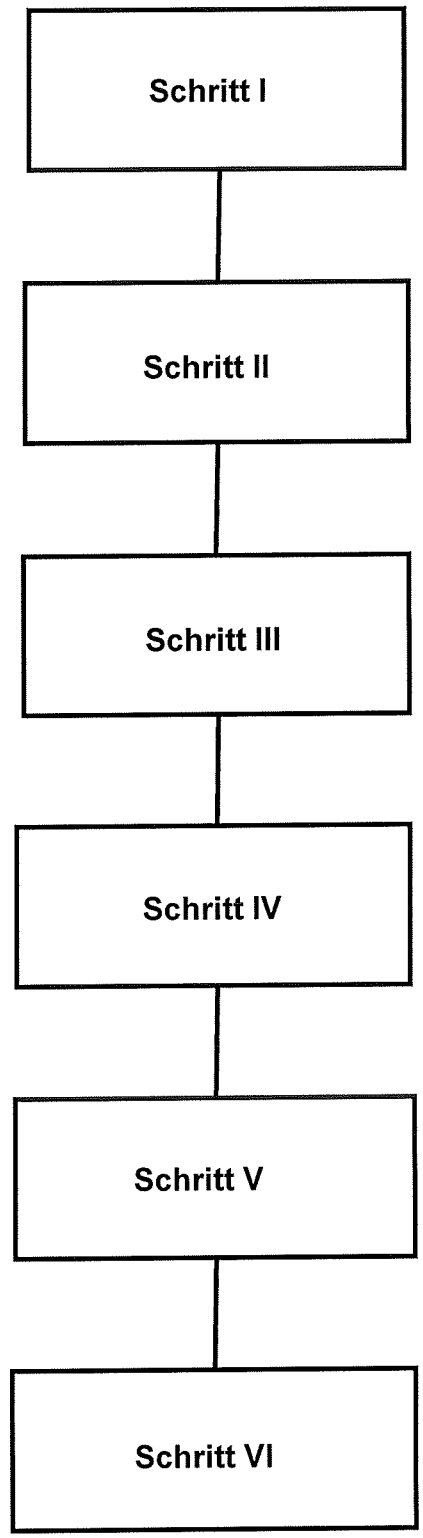

The invention relates to a method for processing steel slag to produce a hydraulic mineral binder with a high hardening potential and to recover iron according to claim 1.

Steel slag, which is also called LD slag, LDS (Linz-Donawitz Slag), Electric Furnace Slag (EFS) or SWS (steelworks slag), may—according to the process—still contain very large quantities of iron. This iron is present partly in metallic form but mainly in the form of oxides minerally bonded in the slag. These iron oxides present in the slag cannot be recovered in a purely mechanical way, as they are fixedly incorporated in the slag matrix and must initially be transformed into the elementary metallic form through a thermochemical reduction. The slag matrix consists mainly of the typical oxides calcium oxide, silicon dioxide and aluminium oxide. In contrast with other slag forms, such as for example blast furnace slag, however, they do not arise in hydraulically active phases and hence are not suited for high-quality reutilisation in cement. They are therefore used almost exclusively as lump slag, thus as grit in highway construction.

EP 1 370 501 B1 discloses for example a method for treating steel slag in order to provide the slag with the properties of a hydraulic binder. The resulting product is described as at least equivalent to Portland cement clinker. In this case, the steel slag—which contains, relative to the slag total weight, at least 45 wt. % of calcium oxide and less than 30 wt. % of $Fe_2O_3$—undergoes oxidising treatment with oxygen or air at a pressure ranging between 1 and 15 bars, at a temperature ranging between 1650° C. to 1400° C. A lime source is added to this slag and supplemented if required with a silicon dioxide source or an aluminium oxide source. The proportions of the lime source and optionally the silicon dioxide or aluminium oxide source are selected so that the slag, after transformation and at room temperature, has a $Fe_2O_3$ content of at least 13 wt. % and a mineralogical composition comprising at least 40 wt. % of the mineralogical phase or mineral phase $C_3S$ and more than 10 wt. % of calcium chloride/fluoride in the form of the mineralogical phases $C_2F$ or $C_4AF$.

A disadvantage of this method is that the iron present in the slag is not recovered and extensive cooling measures are necessary to stabilise the $C_3S$ produced.

Another method for processing steel slag is described in EP 1 697 271 B1. In this case, a hydraulic binder is to be produced having at least 25 wt. % of calcium and magnesium alumosilicates, at least 5 wt. % of mineral oxides and/or halides as well as maximum 31 wt. % of aluminium oxide, at most 10 wt. % of calcium-alumo-ferrite and at most 0.01 wt. % of carbon. In order to obtain this product—starting materials—including also steel slag—are to be melted in corresponding quantities in a reducing atmosphere. The resulting product is to be isolated. This can be carried out by means of rapid cooling, for example with water or air, and also by means of slow cooling.

Irrespectively of the type of cooling, apparently no noteworthy quantities of the main clinker phase alite are formed. It is not described whether and how any elemental iron hereby formed is separated.

WO 96/24696 proposes a method for producing pig iron and cement clinker from iron oxide-containing slag. This can be for example steelworks slag. Provision is made to add iron oxide carriers such as iron ores or scale as well as lime additionally to the slag and to reduce the ferrite slag by adding carbon, wherein an iron phase and a sintered phase are formed. The sintered phase is re-sintered in an oxidising environment and is then removed as clinker. Clinker phases are thus produced under oxidising conditions similarly to the conventional clinker production in the rotary kiln.

GB 1 556 833 describes a method for recovery of iron form steel slag utilizing additives and reduction. The steel slag is to be converted into Portland cement by combustion with further additives such as chalk after a portion of the iron is separated.

Also from US2012/0073406 A1 a method for recovery of iron from steel slags is known. Therefore, the slags are charged with a reducing agent for reducing a share of present iron oxides. Subsequently, the slag is foamed by means of steam. After separating a share of the iron and after cooling, the remaining slag should be used as cement material similar to fly ash or slag sand. Similar methods for the recovery of iron from steel slag and the use of the remaining slag as fly ash or slag sand are known from JP 2012 001797 A and JP S51122670.

It is thus the object of the invention to indicate a method for processing steel slag, wherein both a hydraulic mineral binder with a high hardening potential can be produced and also iron can be recovered. It is further an object of the invention to provide a hydraulic mineral binder with a high hardening potential which is preferably based primarily on the formation of a reactive alite phase.

This object is achieved according to the invention through a method for processing steel slag having the features of claim 1.

Advantageous embodiments of the invention are indicated in the sub-claims and in the description.

In the method according to the invention there is firstly provision for a feed product comprising steel slag with iron compounds, in particular in oxide form, and MnO, i.e. manganese oxide whereby the MnO i.e. manganese oxide may be contained in the steel slag. This feed product is further processed as melt, preferably in a furnace, by incorporating reducing agents into the melt to reduce the iron compounds in order to achieve a lime saturation factor of between 90 and 110 in the mineral melt part, wherein the reducing agent is incorporated in a non-oxidising atmosphere. Non-oxidising conditions thus prevail in the atmosphere of the furnace. Subsequently the melt is cooled in a defined way with the melt solidifying after 15 minutes at the latest. At least part of the elemental iron is then mechanically separated from the solidified melt. The solidified melt, which has a reduced iron content and an alite content of at least 40 wt. % with a content of crystalline phases of at least 60 wt. %, is then supplied for use as a hydraulic mineral binder. In other words, the solidified melt that comprises a reduced iron content may be used directly as a kind of Portland cement, because it exhibits similar crystalline phases.

According to the meaning of the invention, feed product is intended to mean the steel slag and, if necessary, further correcting components such as MnO or $SiO_2$. Sufficient MnO, i.e. manganese oxide may hereby already be present in the slag, meaning that MnO does not need to be added as a correcting component. This is the case at least with some steel slags examined. The iron compounds are present in most cases in the steel slag as iron halides, iron sulphides, iron selenides and in particular iron oxides such as FeO, $Fe_2O_3$ or $Fe_3O_4$.

The feed product can be heated in suitable receptacles to the melt or it can also be provided externally in the melt-liquid state. An electric arc furnace, in particular in a three-phase closed form, may be used for example to melt the feed product or to further heat the melt.

By introducing the reducing agents, the iron compounds are transformed into the elemental metallic form. Through this, in the mineral melt part, a lime saturation factor in a range of between 90 and 110, preferably between 95 and 105, is achieved. The mineral melt part can in this case be understood to be the melt less the elemental iron. The lime saturation factor (KSt) indicates the CaO content actually present in the raw material or clinker as a percentage of the respective CaO content which can be bonded under large-scale combustion and cooling conditions in the maximum case to $SiO_2$, $Al_2O_3$ and $Fe_2O_3$.

It is defined by the following equation:

$$KSt = \frac{100 \cdot CaO}{2.80 \cdot SiO_2 + 1.1 \cdot Al_2O_3 + 0.7 \cdot Fe_2O_3}$$

(where KSt=lime saturation factor).

By carrying out the reduction in a non-oxidising atmosphere, back-oxidation of the iron which has already been reduced is prevented and thus increases the yield of elementary iron. This further contributes to achieving the lime saturation factor.

A large proportion of the iron settles in the lower region of the melt vessel due to the greater density relative to the remainder of the slag. A further portion remains in the form of droplets and inclusions in the cooled slag. The large proportion of the Fe produced can be removed from the vessel. This can be carried out in the melt-liquid state similar to a run-off or in the solidified state similar to a salamander.

After the melt has solidified a proportion of the elemental iron can be mechanically separated and supplied for a further utilisation.

The slag with the reduced iron content can be used as hydraulic mineral binder. This binder is described below as LDS binder.

The method according to the invention allows, in a simple and efficient manner, a high proportion of elemental iron to be recovered from steel slag and furthermore an extremely reactive hydraulic mineral binder to be obtained which is eminently suited as composite material for high-quality binders or as independent clinker material. This LDS binder is characterised by very high reactivity and hardening capacity as well as by its clinker phases. It has an alite content ($C_3S$) of at least 40 wt. % with a content of crystalline phases of at least 60 wt. %. The crystalline phases comprise for the large part alite and belite ($C_2S$) and can even be between 80 wt. % and 90 wt. %.

The invention is based essentially upon three interacting basic ideas: firstly, the provision of MnO in the melt; secondly, the reduction of the iron until the indicated lime saturation factor is reached in the mineral melt part; and, thirdly, the rapid defined cooling.

The defined cooling process causes the formation of a very large proportion of crystalline phases with high alite content.

The particularly high reactivity of the alite phase obtained is due to the presence of $Mn^{2+}$ ions, which are incorporated into the lattice structure of the alite phase and disturb this, with the result that the hardening potential of the LDS binder—due in particular to the alite phase—is considerably increased.

In the inventive processing of the melt under reducing conditions the Mn is present in its bivalent form as $Mn^{2+}$. Introduction into the lattice of the alite is thus possible, whereby Ca is replaced in the lattice. Incorporation rates of up to 2% are hereby achieved.

This is not possible in conventional cement clinker production. Insofar as Mn compounds are present in the cement raw materials, the Mn will be present through the oxidative process in the cement clinker production as $Mn^{3+}$. In this way the $Mn^{3+}$ tends to be incorporated onto the lattice sites of the Fe in the $C_4AF$. An incorporation of $Mn^{3+}$ onto the Ca lattice sites of the alite or the belite is not possible.

Consequently, a comparable reactivity increase of the alite is not possible in conventional cement clinker production in an oxidising atmosphere, as the manganese, if present, is present as $Mn^{3+}$. The same also applies to all methods for treating steel slag which are carried out under oxidising conditions.

Besides the increase in reactivity, the manganese incorporation into the alite phase is able to stabilise this phase and to prevent the breakdown into belite and unslaked lime, irrespectively of the chosen cooling conditions.

Finally, the required lime saturation factor also plays a decisive role in the high proportion of crystalline phases with high alite content and the high reactivity of the LDS binder according to the invention.

In principle, any amount of MnO may be present in the feed product. It is advantageous, however, if the feed product has 0.1 wt. % to 10 wt. %, in particular 0.5 wt. % to 5 wt. %, of MnO. At this content level of manganese oxide it is guaranteed that a significant quantity of $Mn^{2+}$ ions will be incorporated into the crystal lattice of the alite phase and thereby disturb the crystal structure.

It is advantageous if the feed product contains up to 5 wt. % of $Al_2O_3$ and/or 30 to 50 wt. % of CaO and/or 10 to 20 wt. % of $SiO_2$. It is even more advantageous if the feed product contains 3 to 5 wt. % of $Al_2O_3$ and/or 35 to 45 wt. % of CaO and/or 15 to 20 wt. % of $SiO_2$.

With these phase compositions the formation of the alite phase and further crystalline phases is enhanced having regard to thermochemical viewpoints. Furthermore, in these concentration ranges of the involved oxides, it is highly probable that a lime saturation factor of between 90 and 110, or, even more preferably, between 95 and 105, will be achieved. Should the aforementioned composition not already be contained in the steel slag material supplied, the oxides lacking can optionally be added before or during the melt process.

The melt advantageously has a temperature of approximately 1450° C. to approximately 1800° C., in particular from 1550° C. to 1750° C., preferably not more than 1650° C., before and/or during the reduction. All components of the feed product, in particular the oxide portions, are completely melted in this temperature range and the reduction reaction takes place sufficiently quickly so that a rapid progression of the reduction process is guaranteed also from energy and thermo-chemical viewpoints.

The non-oxidising atmosphere can be a reducing atmosphere. The reduction process, which takes place mainly through the added reducing agents in solid form, is thereby further supported.

Preferably carbon, silicon and/or other metals or semi-metals are used as reducing agents. In particular petroleum coke is a suitable carbon modification as it has a very high specific surface and correspondingly high reactivity. Silicon, calcium and aluminium have the further advantage that the oxides can form parts of the slag.

At least a part of the reducing agent can be blown into the melt, for example by means of an inert gas flow. Hollow electrodes are particularly suitable for blowing the reducing agent into the melt when using an electric arc furnace. Besides a particularly efficient distribution of the reducing agent in the melt, a further contribution to mixing is achieved by the blowing-in. The use of an inert gas ensures that undesirable secondary reactions, in particular oxidation of the reducing agent and the oxide components contained in the melt, are avoided. Argon, for example, is suited for use as an inert gas. However, other methods can also be used to incorporate or blow the reducing agents into the melt-liquid slag. A different proportion of the reducing agent can optionally be previously mixed with the feed slag in a certain ratio. This is possible in particular in the case of renewed melting of the slag. It is more favourable in energy terms, however, to take the already melt-liquid slag from an upstream process. It can be preferable in this case to blow in the entire reducing agents.

When using carbon as a reducing agent, carbon monoxide and carbon dioxide can be produced as by-products of the reduction of the oxides. These by-product gases escape from the melt and this can lead to foaming of the melt. In order to reduce foaming, it may be advantageous to incorporate a flux, for example boron in oxide form such as borax, into the melt.

According to a preferred embodiment of the method according to the invention, liquid elemental iron is separated after the reducing process and before the solidification of the melt. As liquid elemental iron has a higher density than the melt phase, it collects at the bottom of the melt furnace and can be removed from there relatively simply. Melt furnace or melting unit can be understood within the scope of the invention to mean a receptacle for receiving the melt phase, which allows the melt to be kept in the liquid state through additional energy input, for example an electric arc furnace.

In principle the melt is cooled in such a way that it has solidified before reaching the 15-minute threshold. An essential feature in this case is that it is cooled to below the transformation temperature, which is approximately 850° C.

Different methods can be used to cool the melt. An essential feature is that the desired maximum cooling time is met. It is possible for example to use a device similar to that used in the conventional clinker cooling, for example a grate cooler, or also as in the production of white cement clinker (water cooling), which cools the melt quickly so that it has solidified in less than 15 minutes, for example between 10 minutes and 15 minutes or between 7 minutes and 9 minutes.

If the melt is to be cooled even more quickly so that it solidifies for example after three minutes or less, cooling methods in combination with granulation processes are an option.

The melt can for example be granulated wet or dry and be simultaneously cooled. In the case of wet cooling and respectively granulation, the cooling speed is approximately 1600° C. per minute. In contrast, while cooling with air granulation the cooling speed lies in most cases below this value. Depending upon ambient conditions, such as water or air flow-rate, cooling times in the range of two minutes or less, such as for example one minute or less than half a minute, can be achieved. It is to be considered within the scope of wet granulation—as a hydraulic reactive material is produced—that this material should in turn be dried as quickly as possible after cooling.

Within the scope of the cooling process with air, the energy absorbed from the air can be recovered. In this connection, the heat of the air heated by the granulation process can be used for example for steam production. This steam can then in turn be used to operate steam turbines which produce electrical energy by means of generators. This energy can then be used in turn for the method according to the invention or for other purposes. Obviously, the use of other cooling methods is also possible if these facilitate sufficiently rapid solidification.

According to a preferred embodiment of the method according to the invention the mechanical separation of the elemental iron takes place by means of a grinding process and a classifying process. For this method step, a method is suited in particular, as disclosed in the international patent application WO 2011/107124 A1. The iron is released during the grinding process and then separated on a grinding plate through the density differences between the iron and the mineralogical matrix. It is subsequently discharged over the plate edge and further enriched optionally through subsequent sorting and classification processes. In order to comminute and de-agglomerate the solidified melt, a roller mill, preferably of the LOESCHE type, is used.

In addition the invention relates to a hydraulic mineral binder which has a mineralogical composition of at least 40 wt. % of alite ($C_3S$) and a lime saturation factor of approximately 90 to 110. A higher alite content of 50 wt. %, in particular 60 wt. %, is preferable. The belite content is preferably between 15 wt. % and 25 wt. %. The hydraulic mineral binder can be produced by means of the method according to the invention and is also described within the scope of the invention as LDS binder.

The LDS binder has a mineralogical composition of maximum 30 wt. % of glass phases, preferably less than 20 wt. %. The remaining percentage contents are present essentially in crystalline phases.

Figure 2:
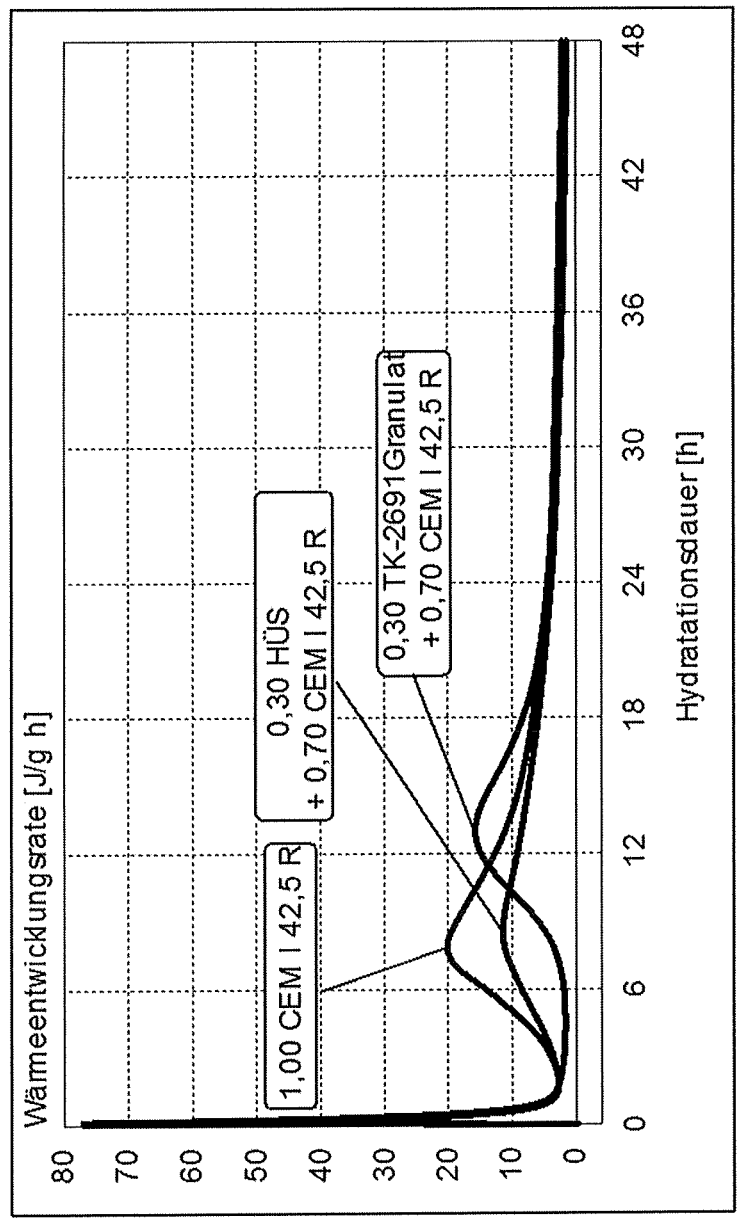

The invention will be explained in greater detail below with the aid of a schematic exemplary embodiment by reference to the figures, in which:

FIG. 1 shows a schematic flowchart of an embodiment of the method according to the invention; and FIG. 2 shows a bar chart revealing the heat production rate of the hydraulic mineral binder according to the invention.

A feed product is provided in step I in the flowchart according to FIG. 1. This feed product comprises essentially LD slag. The feed product has a MnO content in the range of between 1 wt. % and 5 wt. %. Many LD slags, which are also described as SWS, already have a MnO content in the desired range. If this is not the case, the MnO is added to the slag. Further correcting substances, for example $SiO_2$-containing substances, can also be added at this time or at another time in order to achieve the subsequently necessary lime saturation factor. Reducing agents can already be added to the feed product in this step. Petroleum coke, for example, is suitable for this purpose.

In the subsequent step II, the processing of the feed product to the melt takes place, if required. The slag can either be obtained already in the melt-liquid state from an upstream process or can also be present in the cold solid form. Melting and/or heating of the slag can take place in an electric arc furnace. It can be operated in resistance operation with a fire-resistant composition of graphite or carbon-containing fire-resistant material. The electric arc furnace can also be described as a melt unit.

The melt should reach a temperature of between approximately 1600° C. and 1750° C. before the addition of reducing agents is started in step III.

By reducing the iron compounds in the melt, carbon monoxide and/or carbon dioxide can be produced which escape from the melt as gases. This can lead to foaming of the melt. In order to reduce the foaming, a flux, for example a small quantity of borax, can be added to the melt. The viscosity of the melt is hereby reduced.

In order to suppress the re-oxidation of the reduced iron, the furnace atmosphere is enriched with an inert gas, for example with argon. The argon can also be directly introduced into the melt. A proportion of the reducing agents can then also be blown with the argon flow directly into the melt. The argon flowing through the melt causes swirling of the melt bath and this has a positive effect on the metal separation.

As soon as essentially all the iron compounds present in the feed product have been reduced, the remaining mineral melt part should have a lime saturation factor of between 90 and 110. This is to be noted with the composition of the feed product. The desired lime saturation factor can be achieved with many LD slags.

The majority of the iron—approximately 80% to 90%—settles at the bottom of the melt unit as a separate phase. This phase can be separated still in the liquid state. In step IV, the remaining liquid melt is then removed and subjected to cooling so that it solidifies in less than 15 minutes. This cooling can be realised for example through dry granulation by means of air cooling within less than two minutes.

Since part of the metal phase remains in the solidified granulate, for example in the form of droplets or in inclusions in the mineral part, mechanical processing is necessary to increase the metal yield.

This mechanical separation of elementary iron takes place in stage V through a grinding process by means of a LOESCHE roller mill and subsequent classifying. In this case the iron can be separated due to the difference in density from the mineralogical part. The method described in WO 2011/107124 A1 is particularly suited for this purpose.

The remaining mineral part is the LDS binder according to the invention, which is present in stage VI. It can be utilised as a high-quality hydraulic mineral binder. Since it features a high share of clinker phases, a sinter or combustion process is not necessary any more.

Table 1 lists the chemical composition of a feed product which is an untreated LD slag and the LDS binder obtained by means of the method according to the invention. The values are given here in wt. % in each case. The LDS binder obtained here for example through wet granulation has been cooled by means of water within a few minutes.

TABLE 1

Chemical analysis of the base slag and the LDS binder in wt. %

|  | Base slag (untreated) | LDS binder |
| --- | --- | --- |
| $SiO_2$ | 13.9 | 21.8 |
| $Al_2O_3$ | 1.7 | 4.7 |
| $Fe_2O_3$ | 28.8 | 0.6 |
| CaO | 42.7 | 69.6 |
| MgO | 3.3 | 1.1 |
| $TiO_2$ | 0.47 | 1.05 |
| MnO | 5.2 | 0.23 |
| $SO_3$ | 0.2 | 0.81 |
| $P_2O_5$ | 1.07 | 0.04 |

According to Table 1 there is a lime saturation factor of 70.1 for the base slag and of 104.6 for the LDS binder. Table 2 reproduces the crystalline composition of the base slag and the LDS binder in wt. %.

TABLE 2

Essential phase composition of the base slag and the LDS binder according to Rietveld in wt. %.

|  | Base slag (untreated) | LDS binder |
| --- | --- | --- |
| Alite, $C_3S$ | 5.1 | 56.3 |
| Belite, $C_2S$ | 22.2 | 19.9 |
| XRD amorphous | 38.6 | 21.0 |

As can be deduced from Table 2, it is possible with the method according to the invention to obtain a high alite portion of 56.3 wt. % and at least 76.2 wt. % of crystalline phases in the LDS binder.

It is also to be ascertained, however, that only approximately 20 wt. % of glass phases are produced, although similar cooling is used to that in the case of slag sand production, which normally consists of far more than 90 wt. % of glass phases.

FIG. 2 shows a bar chart of the heat production rate in the case of setting during the early hydration of up to 48 hours of a reference cement (CEM I 42.5 R), of a mixture of 70% reference cement with 30% LDS binder and a mixture of 70% reference cement with 30% slag sand. The LDS binder is described in FIG. 2 as granulate.

By reference to the heat production rate, conclusions can be drawn concerning the reactivity. As is clearly visible, the reactivity is clearly reduced through the addition of the slag sand. In contrast, the time of the heat production and thus the main reactivity, if the LDS binder according to the invention is added, is pushed essentially only further back.

It can be concluded from the above that the LDS binder itself exhibits a high hydraulic activity and is therefore extremely well-suited as a composite material for cement or as an independent clinker material.

In summary it can be ascertained that it is possible through the method according to the invention to recover iron from steel slag and to produce a hydraulic mineral binder having a surprisingly good hardening capacity.

The invention claimed is:

1. A method for processing steel slag to produce a hydraulic mineral binder with high hardening potential and to recover iron, comprising the steps:
   providing a feed product comprising steel slag with iron compounds, and MnO, whereby the MnO may be contained in the steel slag, processing the feed product as melt in a furnace,
   incorporating reducing agents into the melt to reduce the iron compounds in order to achieve a lime saturation factor in a mineral part of the melt between 90 and 110, wherein the reduction is carried out in a non-oxidizing furnace atmosphere,
   cooling the melt such that the melt solidifies in less than 15 minutes, and
   mechanically separating at least part of the elemental iron from the solidified melt,
   wherein the solidified melt following the mechanical separation has a reduced iron content and an alite content of at least 40 wt. % with a content of crystalline phases of at least 60 wt. %, and wherein the solidified melt with the reduced iron content is for use as a hydraulic mineral binder.

2. The method according to claim 1, characterized in that the feed product comprises 0.1 to 10 wt. % of MnO.

3. The method according to claim 1, characterized in that the feed product contains one or more of the compounds in the group consisting of: up to 5 wt. % of $Al_2O_3$, 30-50 wt. % of CaO, or 10 to 20 wt. % of $SiO_2$.

4. The method according to claim 1, characterized in that the melt has a temperature of approximately 1450° C. to approximately 1800° C. before and/or during the reduction.

5. The method according to claim 1, characterized in that the non-oxidizing atmosphere is a reducing atmosphere.

6. The method according to claim 1, characterized in that at least one of carbon, silicon and other metals or semi-metals are used as reducing agents.

7. The method according to claim 1, characterized in that at least part of the reducing agent is blown into the melt.

8. The method according to claim 7, characterized in that the reducing agent blown into the melt is blown in by means of an inert gas flow.

9. The method according to claim 1, characterized in that a flux is incorporated into the melt.

10. The method according to claim 1, characterized in that liquid elemental iron is separated after the reduction and before solidification of the melt.

11. The method according to claim 1, characterized in that the melt has solidified after 3 minutes at the latest.

12. The method according to claim 1, characterized in that the defined cooling is carried out by means of devices for dry or wet granulation.

13. The method according to claim 1, characterized in that the defined cooling is carried out by means of active cooling devices.

14. The method according to claim 1, characterized in that the mechanical separation of the elemental iron takes place by means of a grinding process and a classifying process.

* * * * *